(12) United States Patent
Kaneko

(10) Patent No.: US 10,844,925 B2
(45) Date of Patent: Nov. 24, 2020

(54) ROTARY DAMPER

(71) Applicant: OILES CORPORATION, Tokyo (JP)

(72) Inventor: Ryohei Kaneko, Fujisawa (JP)

(73) Assignee: OILES CORPORATION, Tokyo (JP)

(*) Notice: Subject to any disclaimer, the term of this patent is extended or adjusted under 35 U.S.C. 154(b) by 45 days.

(21) Appl. No.: 16/301,288

(22) PCT Filed: May 15, 2017

(86) PCT No.: PCT/JP2017/018245
§ 371 (c)(1),
(2) Date: Nov. 13, 2018

(87) PCT Pub. No.: WO2017/204022
PCT Pub. Date: Nov. 30, 2017

(65) Prior Publication Data
US 2019/0353219 A1 Nov. 21, 2019

(30) Foreign Application Priority Data

May 25, 2016 (JP) ................................. 2016-104540

(51) Int. Cl.
*F16D 57/00* (2006.01)
*F16F 9/14* (2006.01)

(52) U.S. Cl.
CPC ............... *F16F 9/14* (2013.01); *F16D 57/00* (2013.01); *B60G 2202/22* (2013.01)

(58) Field of Classification Search
CPC ........... F16F 9/14; F16F 9/145; F16F 2232/02
See application file for complete search history.

(56) References Cited

U.S. PATENT DOCUMENTS 1,628,811 A * 5/1927 Shultz ................. F16F 9/145
188/286
6,318,522 B1 11/2001 Johnston et al.
(Continued)

FOREIGN PATENT DOCUMENTS

CN          1605768       4/2005
CN        101828889       9/2010
(Continued)

OTHER PUBLICATIONS

International Search Report for PCT/JP2017/018245, dated Aug. 1, 2017, 3 pages.
(Continued)

*Primary Examiner* — Nicholas J Lane
(74) *Attorney, Agent, or Firm* — Nixon & Vanderhye P.C.

(57) ABSTRACT

Provided is a rotary damper that makes it possible to adjust braking torque characteristics. A rotary damper (1) that restricts the movement of a viscous fluid (6) with which the inside of a cylindrical chamber (200) of a case (2) has been filled and thereby generates braking torque against applied rotational force. A flow path (208) is formed in a partitioning part (204) of the cylindrical chamber (200), and a check valve (3) is movably arranged inside the flow path (208). When a rotor (4) has rotated in a normal rotation direction R1, the check valve (3) moves inside the flow path (208) in a closing direction M1 and closes the flow path (208) and, when the rotor (4) has rotated in a reverse rotation direction R2, moves inside the flow path (208) in an opening direction M2 and opens the flow path (208). The check valve (3) comprises a reaction force application part (302) that generates a reaction force against the check valve (3) when the check valve (3) has moved to a prescribed position in the closing direction M1.

8 Claims, 8 Drawing Sheets

(56) References Cited

U.S. PATENT DOCUMENTS

| | | | |
|---|---|---|---|
| 9,121,468 B2 | 9/2015 | Okimura et al. | |
| 2005/0006189 A1* | 1/2005 | Kanno | F16F 9/145 |
| | | | 188/290 |
| 2005/0072639 A1 | 4/2005 | Orita | |
| 2006/0289257 A1 | 12/2006 | Orita | |
| 2011/0121622 A1* | 5/2011 | Okimura | B60N 2/4228 |
| | | | 297/216.12 |
| 2014/0020994 A1* | 1/2014 | Okimura | B60N 2/2227 |
| | | | 188/282.1 |

FOREIGN PATENT DOCUMENTS

| | | |
|---|---|---|
| CN | 201624592 | 11/2010 |
| CN | 102016346 | 4/2011 |
| CN | 103403388 | 11/2013 |
| JP | 7-301272 | 11/1995 |
| JP | 10-169688 | 6/1998 |
| JP | 2012-215209 | 11/2012 |
| JP | 2014-70640 | 4/2014 |

OTHER PUBLICATIONS

Search Report issued in CN Appln. No. 201780029768.3 dated Jan. 2, 2020 (w/ translation).
Search Report issued in EP Appln. No. 17802615.9 dated Jan. 23, 2020.
Search Report issued in CN Appln. No. 201780029768.3 dated Aug. 12, 2020 (w/ translation).

* cited by examiner

US 10,844,925 B2

ROTARY DAMPER

This application is the U.S. national phase of International Application No. PCT/JP2017/018245 filed 15 May 2017, which designated the U.S. and claims priority to JP Patent Application No. 2016-104540 filed 25 May 2016, the entire contents of each of which are hereby incorporated by reference.

TECHNICAL FIELD

The present invention relates to a rotary damper, and in particular to a rotary damper that can adjust a braking torque characteristic.

BACKGROUND ART

There is known a rotary damper which generates strong braking torque against rotation in the normal direction, while generates weak braking torque against rotation in the reverse direction. For example, the Patent Literature 1 discloses a rotary damper that is simple in structure and can be manufactured at low cost.

The rotary damper described in the Patent Literature 1 comprises: a case having a cylindrical chamber; a rotor received rotatably in the cylindrical chamber; viscous fluid filled in the cylindrical chamber; and a lid which is fixed to an open-side end surface of the case that confines the rotor together with the viscous fluid in the cylindrical chamber.

The rotor comprises: a rotor body of a cylindrical shape; and a vane formed to protrude outward in the radial direction from the outer peripheral surface of the rotor body so that a slight gap is formed between the vane and the inner peripheral surface of the cylindrical chamber. In the vane, a flow path is formed to run from one side surface (referred to as the first side surface) perpendicular to the rotation direction of the rotor to the other side surface (referred to as the second side surface). Further, a seal member is attached to an end surface (the surface facing the inner peripheral surface of the cylindrical chamber) of the vane so as to close the slight gap between the vane and the inner peripheral surface of the cylindrical chamber. This seal member has a check valve of elastic material for opening and closing the flow path formed in the vane. In the inner peripheral surface of the cylindrical chamber, a partitioning part is formed to protrude inward in the radial direction so that a slight gap is formed with the outer peripheral surface of the rotor body.

In the rotary damper described in the Patent Literature 1 of the above-described configuration, when force to rotate the rotor in the direction (normal rotation direction) from the first side surface of the vane toward the second side surface of the vane is applied to the rotor, the viscous fluid in the cylindrical chamber presses the check valve against the second side surface of the vane, so that the check valve closes the flow path. Accordingly, movement of the viscous fluid is limited only to movement through the gaps between the partitioning part of the cylindrical chamber and the outer peripheral surface of the rotor body and a gap between closed-side end surface (bottom surface) of the case and the lower surface (surface facing the closed-side end surface of the case) of the vane. As a result, the pressure of the viscous fluid on the side of the second side surface of the vane is increased, and strong braking torque is generated. On the other hand, when force to rotate the rotor in the direction (reverse rotation direction) from the second side surface of the vane toward the first side surface of the vane is applied to the rotor, the viscous fluid on the side of the first side surface of the vane flows into the flow path, and pushes up the check valve, to release the flow path. Thus, movement of the viscous fluid occurs also through the flow path formed in the vane, and therefore the pressure of the viscous fluid on the side of the first side surface of the vane is not increased and, as a result, weak braking torque is generated.

CITATION LIST

Patent Literature

Patent Literature 1: Japanese Unexamined Patent Application Laid-Open H07-301272

SUMMARY OF INVENTION

Technical Problem

In the rotary damper described in the Patent Literature 1, when rotating force in the normal direction is applied to the rotor, the check valve closes the flow path immediately, to generate strong braking torque. However, depending on uses of rotary damper, such a braking torque characteristic (initial motion characteristic in the normal direction) is desired that braking torque increases gradually and finally strong braking torque is generated. The rotary damper described in the Patent Literature 1 considers nothing of adjustment of braking torque characteristic.

The present invention has been made taking the above conditions into consideration, and an object of the present invention is to provide a rotary damper that can adjust braking torque characteristic.

Solution to Problem

To solve the above problems, according to the present invention, a flow path which connects regions partitioned by a partitioning part or a vane in a cylindrical chamber is formed in the partitioning part or the vane. Further, the present invention provides: a check valve which moves in the flow path so as to close the flow path when rotating force in a normal direction is applied to a rotor, and to open the flow path when rotating force in a reverse direction is applied to the rotor; and a reaction-force giving means which generates reaction force to the check valve when the check valve moves to a prescribed position in the direction of closing the flow path.

For example, the present invention provides a rotary damper which generates braking torque against applied rotating force by limiting movement of viscous fluid, comprising:

a case which has: a cylindrical chamber filled with the viscous fluid; and a partitioning part having a protruded shape which is formed along a center line of the cylindrical chamber and inward in a radial direction from an inner peripheral surface of the cylindrical chamber;

a rotor which has: a rotor body received in the cylindrical chamber rotatably relative to the cylindrical chamber, so that an outer peripheral surface of the rotor body is close to an end surface of the partitioning part; and a vane formed along the center line of the cylindrical chamber and outward in a radial direction from the outer peripheral surface of the rotor body, so that an end surface of the vane is close to the inner peripheral surface of the cylindrical chamber;

a lid which is fixed to an opening part of the cylindrical chamber, to confine the rotor together with the viscous fluid in the cylindrical chamber;

a flow path which is provided in the partitioning part or in the vane and connects regions in the cylindrical chamber partitioned by the partitioning part or the vane;

a check valve which is movably provided in the flow path, to close the flow path when the rotor rotates relative to the cylindrical chamber in a normal rotation direction and to open the flow path when the rotor rotates relative to the cylindrical chamber in a reverse rotation direction; and a reaction-force giving means, which generates reaction force to the check valve when the check valve moves to a prescribed position in a direction to close the flow path.

Advantageous Effects of Invention

According to the present invention, when the check valve moves to the prescribed position in the direction to close the flow path, the reaction-force giving means gives reaction force to the check valve. Accordingly, to move the check valve further from that position in the direction to close the flow path, it is necessary to apply larger rotating force in the normal rotation direction to the rotor. Thus, according to the present invention, it is possible to realize such braking torque characteristic that, since the reaction-force giving means gives reaction force to the check valve, braking torque against rotating force applied to the rotor in the normal rotation direction is increased gradually and finally the check valve closes the flow path to generate strong braking torque. Further, it is possible to adjust the braking torque characteristic by adjusting the reaction force of the reaction-force giving means.

DESCRIPTION OF EMBODIMENTS

Figure 1:
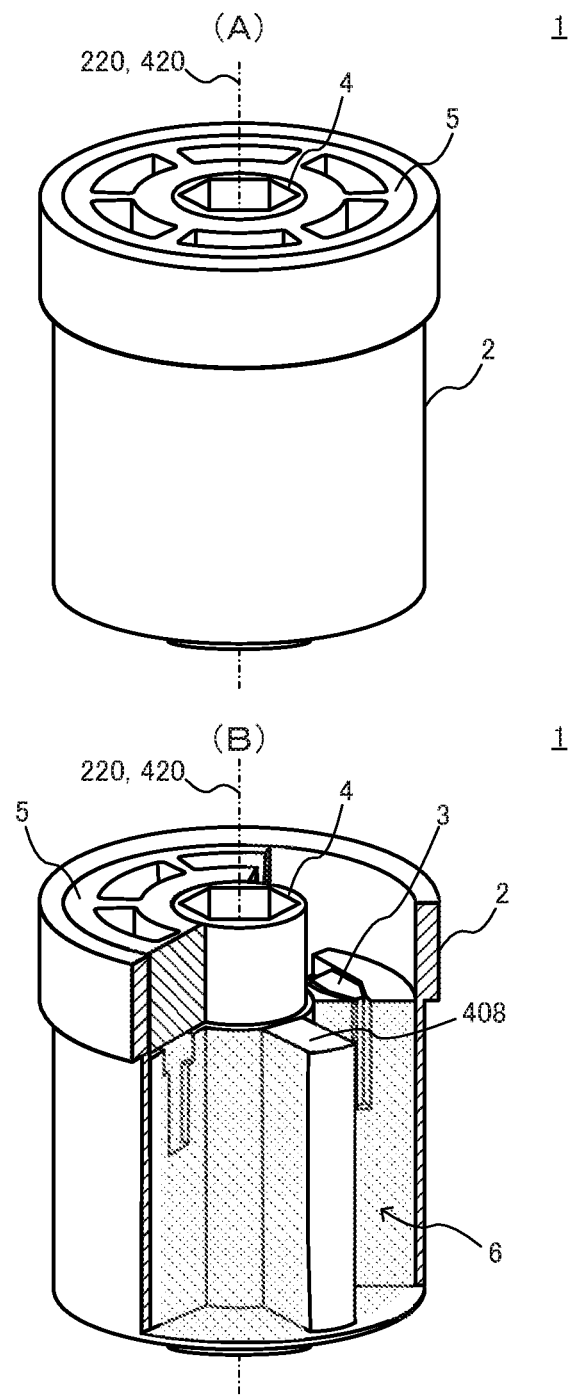
FIGS. 1(A) and 1(B) are respectively an external view and a partial cross-section view showing schematic configuration of a rotary damper 1 according to an embodiment of the present invention.

In the following, one embodiment of the present invention will be described referring to the drawings.

Figure 2:
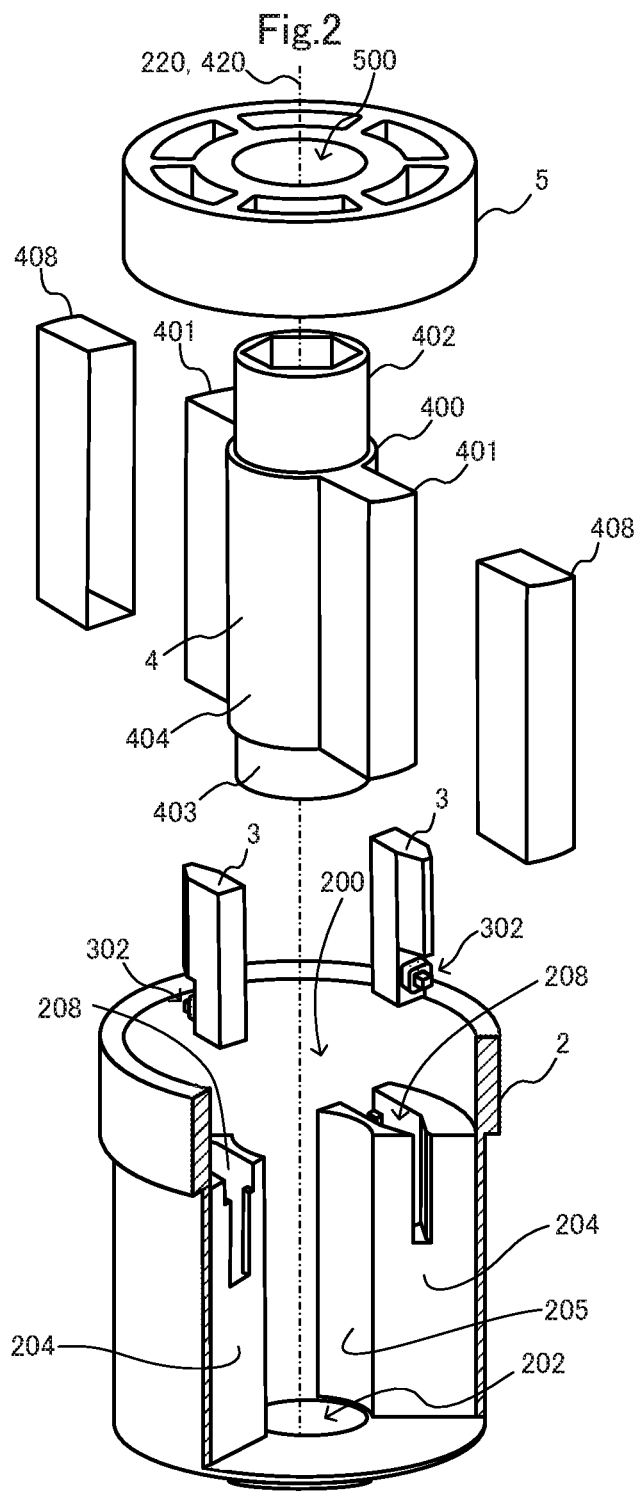
FIG. 2 is an exploded view showing the rotary damper of an embodiment of the present invention.

FIGS. 1(A) and 1(B) are respectively an external view and a partial cross-section view showing schematic configuration of a rotary damper 1 according to the present embodiment, and FIG. 2 is an exploded view of the rotary damper 1 of the present embodiment.

As shown in the figures, the rotary damper 1 of the present embodiment comprises: a case 2; a pair of check valves 3; a rotor 4 received in the case 2 rotatably relative to the case 2; viscous fluid 6 such as oil or silicone filled in the case 2; and a lid 5 for confining the rotor 4 together with the viscous fluid 6 in the case 2.

Figure 3:
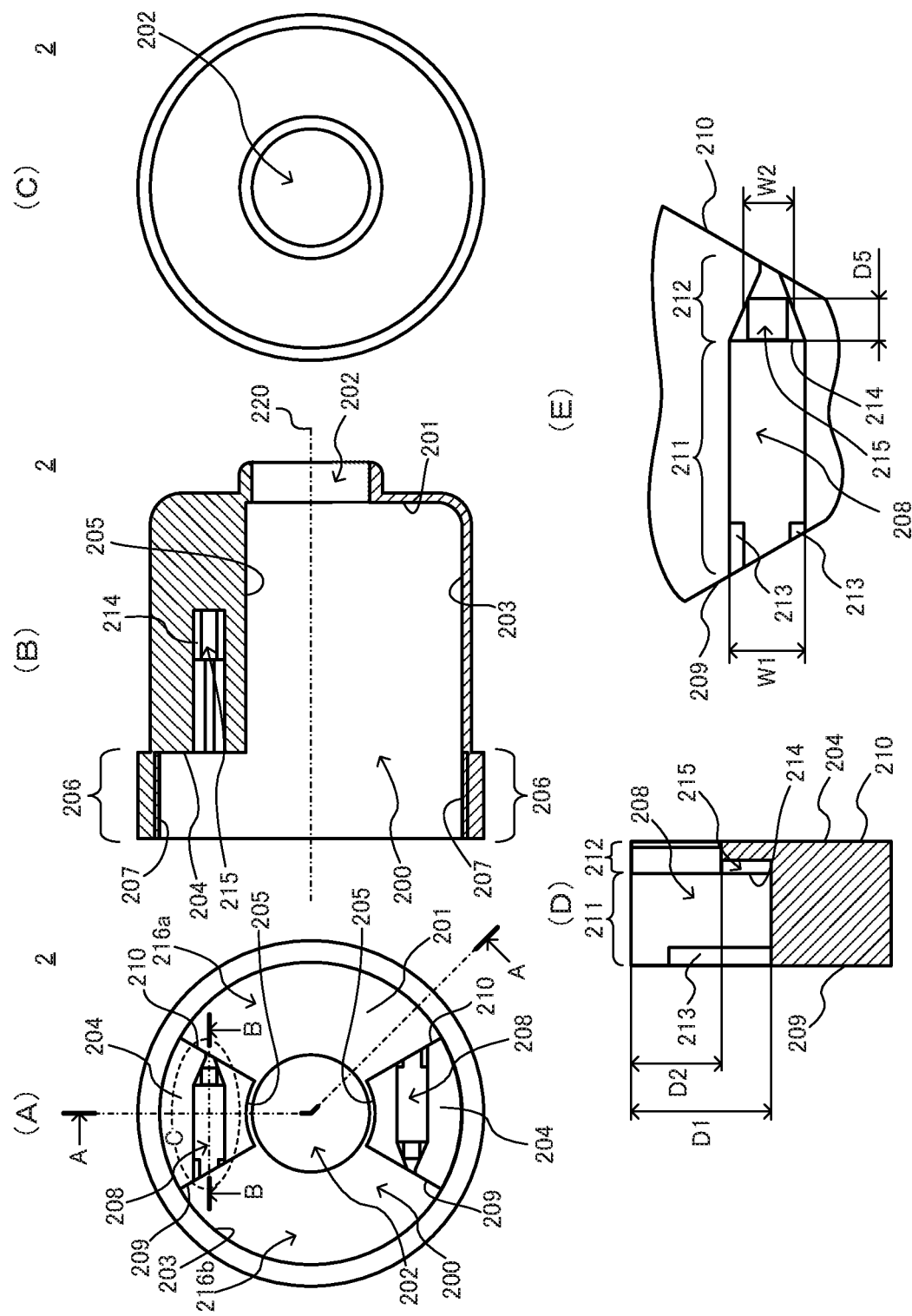
FIG. 3(A) is a front view of a case 2.
FIG. 3(B) is an A-A cross-section view of the case 2 shown in FIG. 3(A)
FIG. 3(C) is a back view of the case 2.
FIG. 3(D) is a B-B cross-section view of the case shown in FIG. 3(A)
FIG. 3(E) is an enlarged view of the part C of the case 2 shown in FIG. 3(A)
Figure 4:
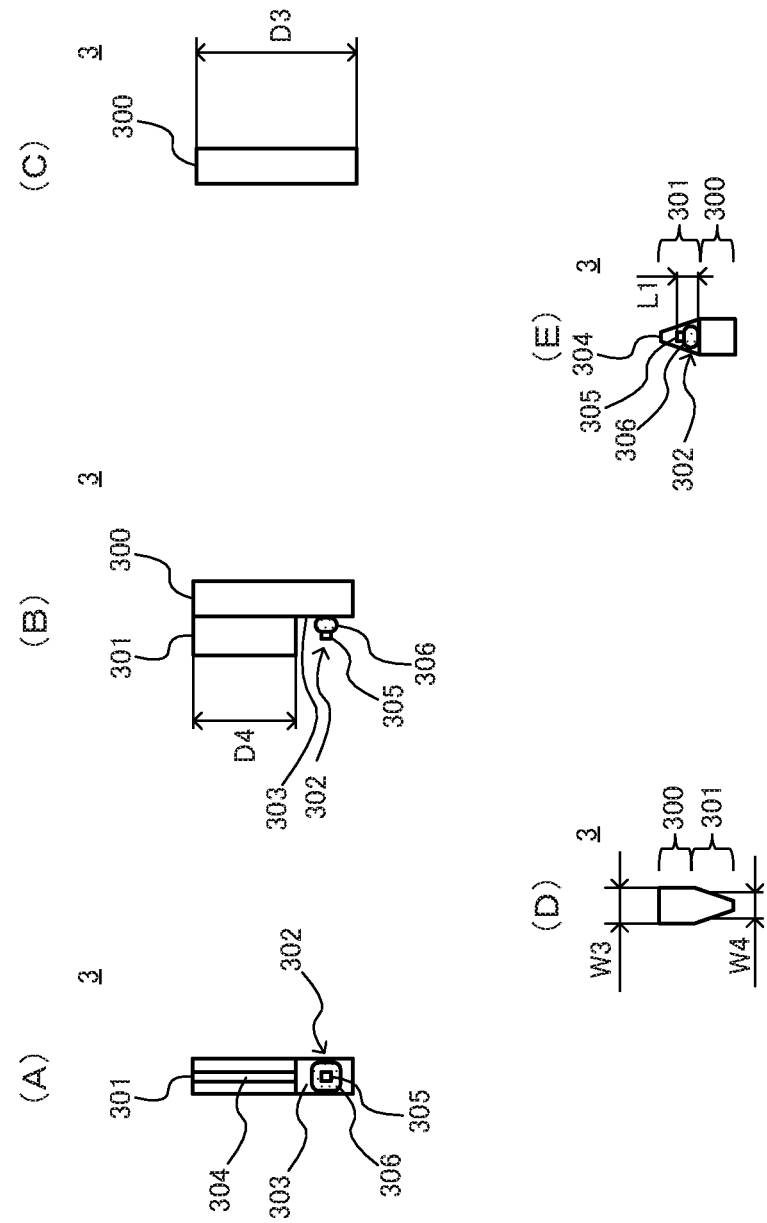
FIGS. 4(A)-4(E) are respectively a front view, a side view, a back view, a top view, and a bottom view of a check valve 3.

FIG. 3(A) is a front view of the case 2, FIG. 3(B) is an A-A cross-section view of the case 2 shown in FIG. 3(A), FIG. 3(C) is a back view of the case 2, FIG. 3(D) is a B-B cross-section view of the case 2 shown in FIG. 3(A), and FIG. 3(E) is an enlarged view of the part C of the case 2 shown in FIG. 3(A).

Figure 5:
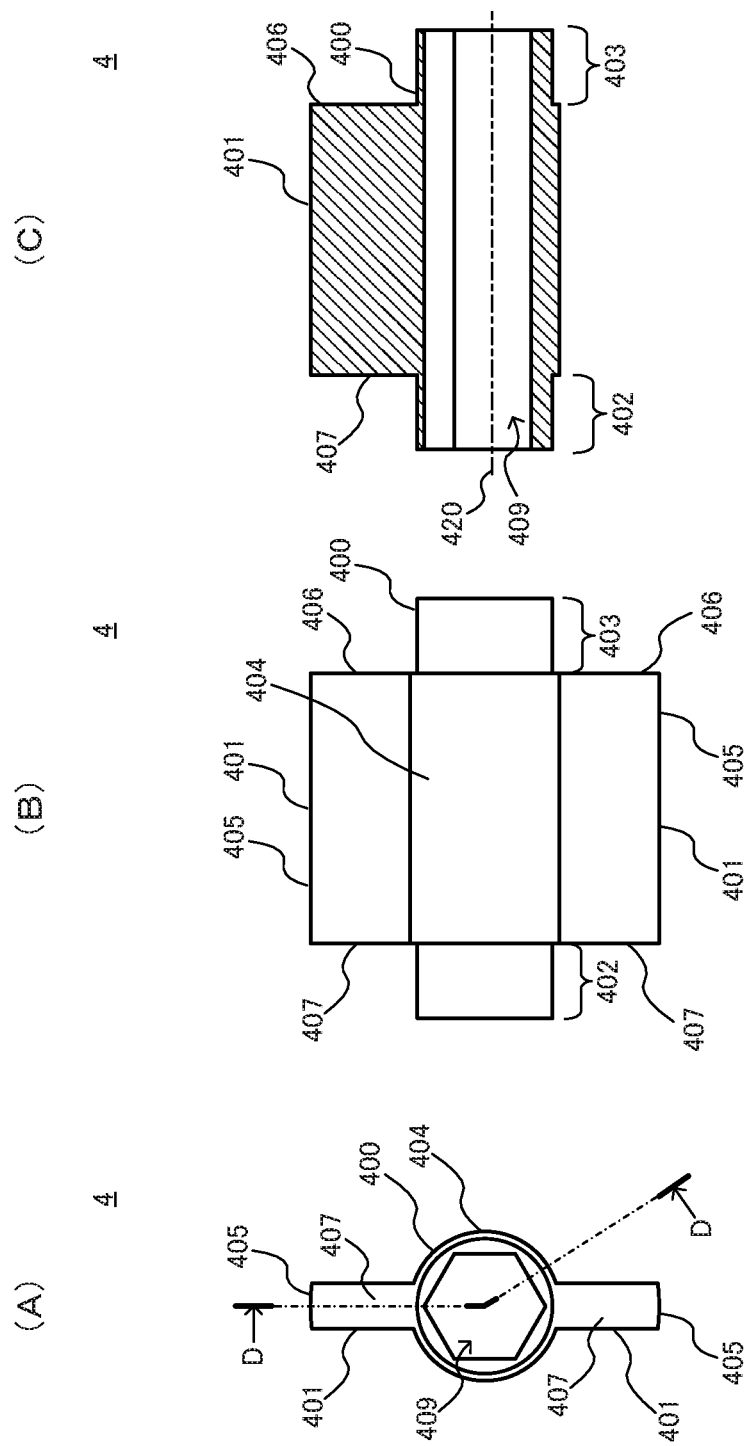
FIGS. 5(A) and 5(B) are respectively a front view and a side view of a rotor 4.
FIG. 5(C) is a D-D cross-section view of the rotor 4 shown in FIG. 5(A)
Figure 6:
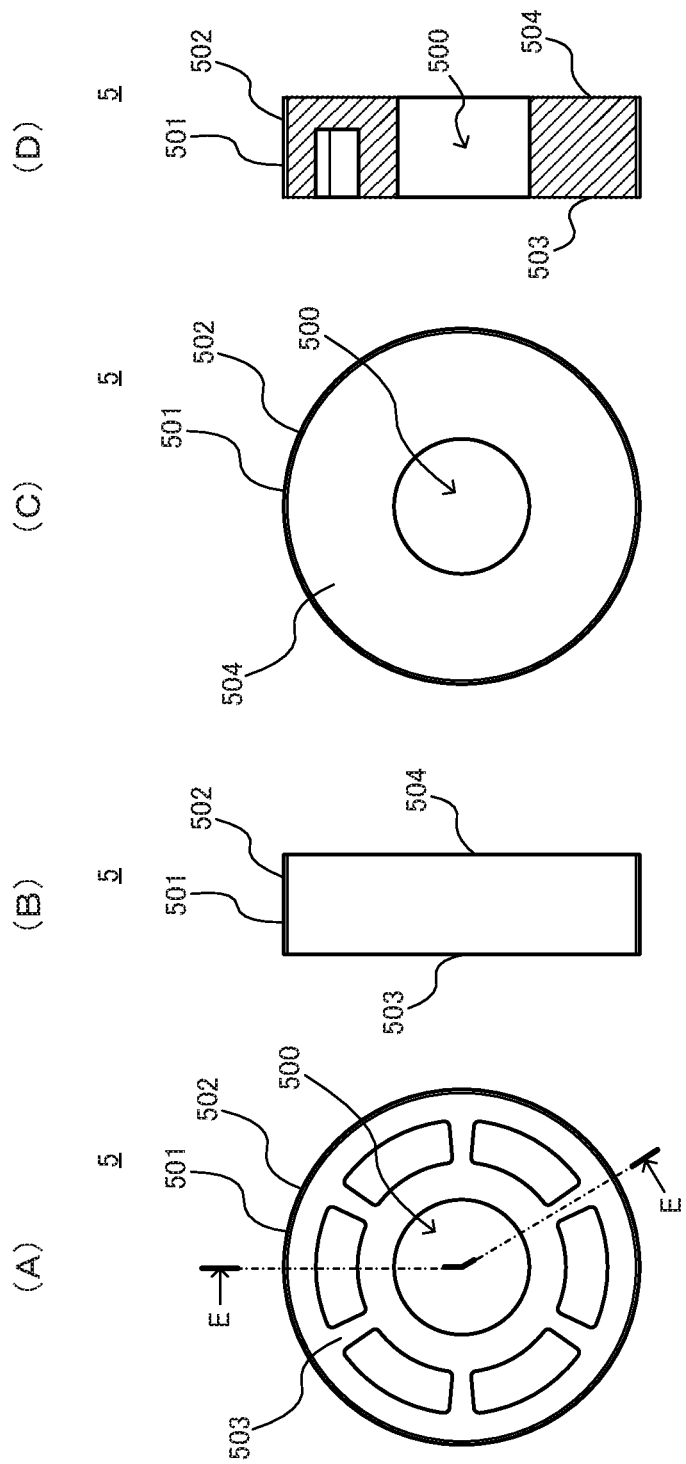
FIGS. 6(A)-6(C) are respectively a front view, a side view, and a back view of a lid 5.
FIG. 6(D) is an E-E cross-section view of the lid 5 shown in FIG. 6(A)

As shown in the figures, a cylindrical chamber (a space of a bottomed cylinder shape) 200 which is opened at one end is formed in the inside of the case 2. In the bottom 201 of the cylindrical chamber 200, an opening part 202 for the rotor 4 is formed. By inserting the lower end 403 (See FIG. 5) of the below-mentioned rotor body 400 into this opening part 202, the rotor 4 is received in the cylindrical chamber 200 such that a rotation axis 420 of the rotor 4 coincides with the center line 220 of the cylindrical chamber 200 (See FIGS. 1 and 2). On the opening side 206 of the inner peripheral surface 203 of the cylindrical chamber 200, a female screw portion 207 which is screwed onto the below-mentioned male screw portion 502 (See FIG. 6) of the lid 5 is formed.

Further, on the inner peripheral surface 203 of the cylindrical chamber 200, a pair of partitioning parts 204 is formed to protrude inward in the radial direction along the center line 220 of the cylindrical chamber 200 axisymmetrically with respect to the center line 220, so as to partition the cylindrical chamber 200 with the end surface 205 of each partitioning part 204 being positioned close to the outer peripheral surface 404 (See FIG. 5) of the below-mentioned rotor body 400 of the rotor 4.

In each partitioning part 204, a flow path 208 is formed to connect regions 216a and 216b in the cylindrical chamber 200 partitioned by the partitioning part 204. A check valve 3 is movably placed in the flow path 208.

Figure 7:
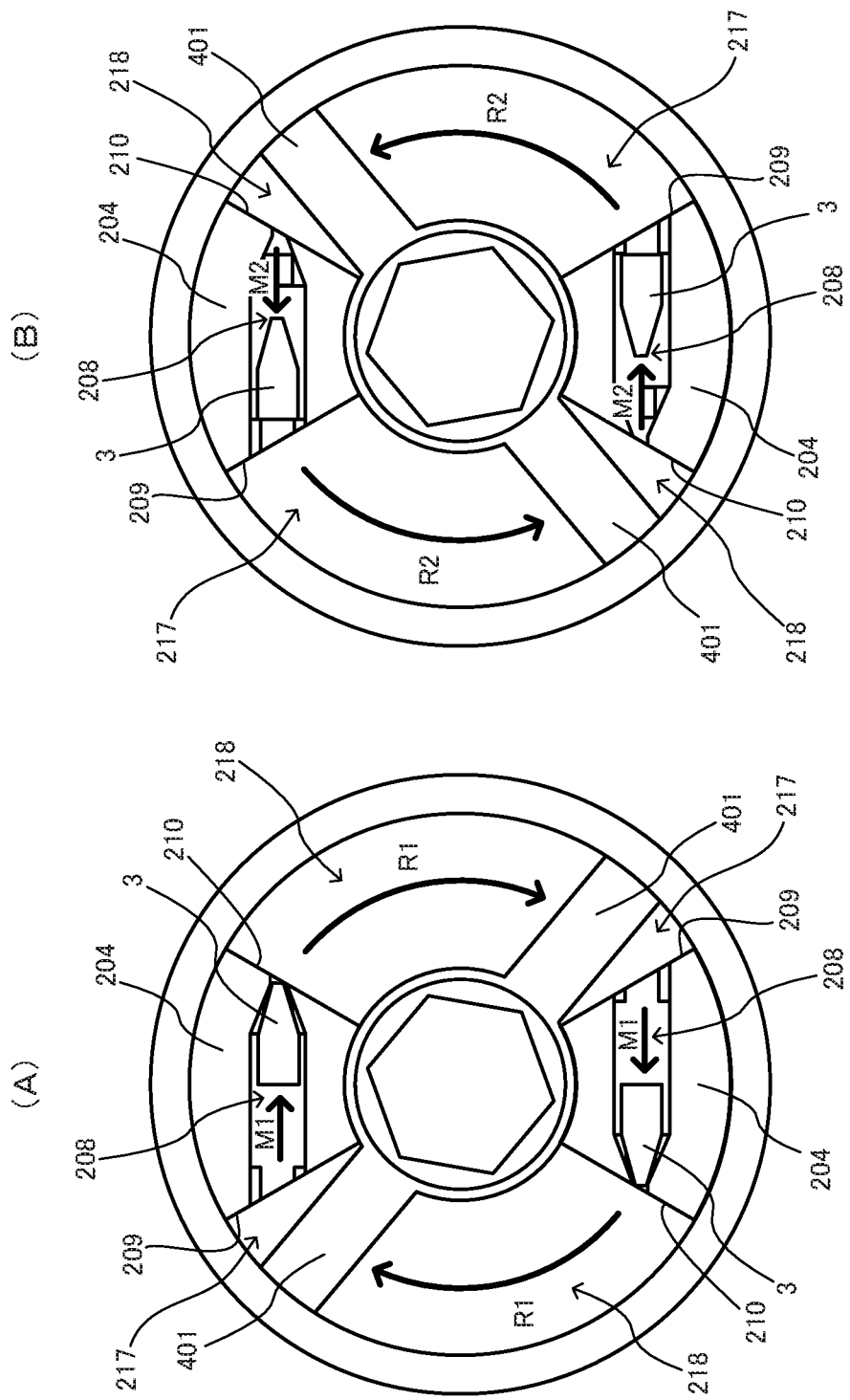
FIGS. 7(A) and 7(B) are views for explaining the operating principle of the rotary damper 1.

The flow path 208 is formed in a linear shape from the end surface 209 on the back side in the normal rotation direction (the direction R1 in FIG. 7) toward the end surface 210 on the front side in the normal rotation direction. The flow path 208 has a constant width W1 in a flow path part 211 on the back side in the normal rotation direction (on the side of the end surface 209), while, in a flow path part 212 on the front side in the normal rotation direction (on the side of the end surface 210), has width W2 that becomes gradually narrower from the constant width W1 toward the front side in the normal rotation direction. Further, the flow path 208 has two-level structure such that the depth D2 of the flow path part 212 on the front side in the normal rotation direction is shallower than the depth D1 of the flow path part 211 on the back side in the normal rotation direction.

Figure 8:
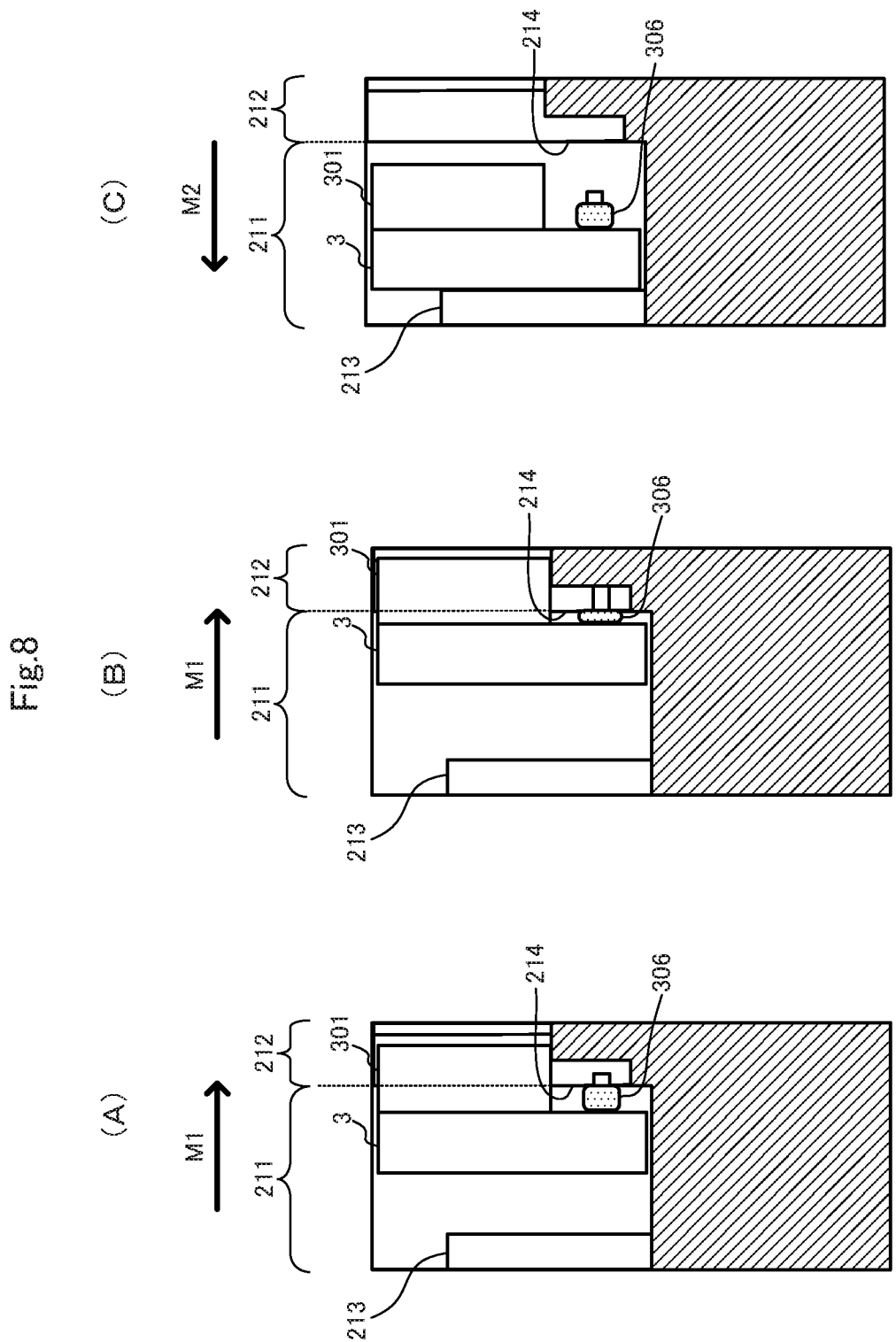
FIGS. 8(A)-8(C) are views for explaining the operation of the check valve 3.

Stoppers 213 are provided in the flow path part 211 on the back side in the normal rotation direction, for preventing falling of the check valve 3 out of the flow path 208 from the side of the end surface 209 when the check valve 3 placed in the flow path 208 moves in the direction to open the flow path 208 (in the direction M2 in FIG. 8). Further, a groove 215 is formed in the step surface 214 between the flow path part 211 on the back side in the normal rotation direction and the flow path part 212 on the front side in the normal rotation direction, along the center line 220 of the cylindrical chamber 200.

FIGS. 4(A)-4(E) are respectively a front view, a side view, a back view, a top view, and a bottom view of the check valve 3.

As shown in the figures, the check valve 3 comprises a valve body 300, a valve part 301, and a reaction-force giving part 302. The valve body 300 is a member of a square column shape which has the height D3 approximately same as the depth D1 of the flow path part 211 of the flow path 208 on the back side in the normal rotation direction and has the width W3 narrower than the width W1 of the flow path part 211 of the flow path 208 on the back side in the normal rotation direction.

The valve part 301 is a member of a trapezoidal column shape which is formed in the upper portion of the side surface 303 of the valve body 300 on the front side in the closing direction (in the direction M1 in FIG. 8) and has the height D4 approximately same as the depth D2 of the flow part 212 of the flow path 208 on the front side in the normal rotation direction, and has the width W4 which becomes gradually narrower toward the front side in the closing direction. However, the width W4 at the upper surface (the end surface on the front side in the closing direction) 304 of the valve part 301 is wider than the width W2 of the flow path 208 at the opening part on the side of the end surface 210 of the flow path part 212 on the front side in the normal rotation direction.

The reaction-force giving part 302 comprises: a mount pillar 305 formed to be directed forward in the closing direction in the lower portion of the side surface 303 on the front side in the closing direction of the valve body 300; and a ring-shaped elastic member 306 such as a rubber ring or a coil spring mounted on the mount pillar 305. When the check valve 3 moves in the closing direction, the ring-shaped elastic member 306 abuts against the step surface 214 in the flow path 208 before the valve part 301 closes the flow path part 212 of the flow path 208 on the front side in the normal rotation direction. Then, the ring-shaped elastic member 306 is pressed and elastically deformed, and thereby the check valve 3 moves further in the closing direction, so that the valve part 301 closes the flow path part 212 of the flow path 208 on the front side in the normal rotation direction. In order that the mount pillar 305 does not prevent closing of the flow path 208, the length L1 of the mount pillar 305 is shorter than the depth D5 of the groove 215 formed in the step surface 214 in the flow path 208.

FIGS. 5(A) and 5(B) are respectively a front view and a side view of the rotor 4, and FIG. 5(C) is a D-D cross-section view of the rotor 4 shown in FIG. 5(A).

As shown in the figures, the rotor 4 comprises: the rotor body 400 of a cylindrical shape; and a pair of vanes (rotary wings) 401 formed axisymmetrically with respect to the rotation axis 420 of the rotor 400.

Each vane 401 is formed along the rotation axis 420 of the rotor 4 and protrudes outward in the radial direction from the outer peripheral surface 404 of the rotor body 400, and partitions the cylindrical chamber 200 by the end surface 405 of the vane 401 being positioned close to the inner peripheral surface 203 of the cylindrical chamber 200 of the case 2. As needed, a sliding member 408 is attached to the vane 401 (See FIGS. 1 and 2). The sliding member 408 functions as a seal member closing the gap between the end surface 405 of the vane 401 and the inner peripheral surface 203 of the cylindrical chamber 200, the gap between the lower surface 406 of the vane 401 and the bottom 201 of the cylindrical chamber 200, and the gap between the upper surface 407 of the vane 401 and the lower surface 504 (See FIG. 6) of the lid 5. As the material of the sliding member 408, resin which is superior in sliding property, such as polyamide, is used.

In the rotor body 400, a through-hole 409 for inserting a hexagon shaft (not shown) which transmits rotating force from the outside to the rotor 4 is formed centering at the rotation axis 420. The upper end 402 of the rotor body 400 is rotatably inserted into an opening part 500 (See FIG. 6) of the lid 5. The lower end 403 of the rotor body 400 is rotatably inserted into the opening part 202 formed in the bottom 201 of the cylindrical chamber 200 of the case 2 (See FIG. 2).

To prevent leakage of the viscous fluid 6 from the opening part 202 of the cylindrical chamber 200 of the case 2 to the outside, a seal member (not shown) such as an O-ring may be placed between the lower end 403 of the rotor body 400 and the opening part 202 of the cylindrical chamber 200.

FIGS. 6(A)-6(C) are respectively a front view, a side view, and a back view of the lid 5, and FIG. 6(D) is an E-E cross-section view of the lid 5 shown in FIG. 6(A).

As shown in the figures, the opening part 500 piercing the upper surface 503 and the lower surface 504 of the lid 5 is formed in the lid 5 at the position to be opposed to the opening part 202 formed in the bottom 201 of the cylindrical chamber 200 of the case 2. The upper end 402 of the rotor body 400 of the rotor 4 is inserted into this opening part 500. Further, in the outer peripheral surface 501 of the lid 5, a male screw portion 502 is formed to screw into the female screw portion 207 formed on the opening side 206 of the inner peripheral surface 203 of the cylindrical chamber 200. To prevent leakage of the viscous fluid 6 from the opening part 500 of the lid 5 to the outside, a seal member (not shown) such as an O-ring may be placed between the upper end 402 of the rotor body 400 of the rotor 4 and the opening part 500 of the lid 5. Similarly, to prevent leakage of the viscous fluid 6 to the outside from the screw-coupling portion between the male screw portion 502 of the lid 5 and the female screw portion 207 of the cylindrical chamber 200 of the case 2, a seal member (not shown) such as an O-ring may be placed between the outer peripheral surface 501 of the lid 5 and the inner peripheral surface 203 of the cylindrical chamber 200.

Next, the operating principle of the rotary damper 1 will be described.

FIGS. 7(A) and 7(B) are views for explaining the operating principle of the rotary damper 1, and FIGS. 8(A)-8(C) are views for explaining the operation of the check valve 3.

As shown in FIG. 7(A), in the case that the rotor 4 rotates relative to the case 2 in the normal rotation direction R1, a region 217 between each vane 401 of the rotor 4 and the end surface 209 on the back side in the normal rotation direction of the partitioning part 204 concerned of the case 2 is compressed, and the viscous fluid 6 in the region 217 flows into the flow path 208. By the force of the viscous fluid 6 that flowed into the flow path 208, the check valve 3 moves in the closing direction M1 in the flow path 208. Then, as shown in FIG. 8(A), the ring-shaped elastic member 306 of the reaction-force giving part 302 of the check valve 3 abuts against the step surface 214 before the valve part 301 of the check valve 3 closes the flow path part 212 of the flow path 208 on the front side in the normal rotation direction, and thus reaction force is applied to the check valve 3, to push back the check valve 3 in the reverse direction to the closing direction M1. Accordingly, pressure of the viscous fluid 6 in the region 217 is increased gradually by rotation of the rotor 4 in the normal rotation direction R1, and the braking torque against the rotating force applied to the rotor 4 in the normal rotation direction R1 increases gradually. Thereafter, as shown in FIG. 8(B), as the ring-shaped elastic member 306 is pressed and elastically deformed, the check valve 3 moves further in the closing direction M1 and closes the flow path part 212 of the flow path 208 on the front side in the normal rotation direction. As a result, movement of the viscous fluid 6 in the flow path 208 is obstructed and the pressure of the viscous fluid 6 in the region 217 is increased rapidly by rotation of the rotor 4 in the normal rotation direction R1, so that strong braking torque is generated against the rotating force applied to the rotor 4 in the normal rotation direction R1.

On the other hand, as shown in FIG. 7(B), in the case that the rotor 4 rotates relative to the case in the reverse rotation direction R2 reverse to the normal rotation direction R1, a region 218 between each vane 401 of the rotor 4 and the end surface 210 on the front side in the normal rotation direction of the partitioning part 204 concerned of the case 2 is compressed, and the viscous fluid 6 in the region 218 flows into the flow path 208. By the force of the viscous fluid 6 that flowed into the flow path 208, the check valve opens the flow path 208, and moves in the opening direction M2 in the flow path 208. Then, as shown in FIG. 8(C), the valve body 300 of the check valve 3 abuts against the stoppers 213 provided in the flow path part 211 of the flow path 208 on the back side in the normal rotation direction. As described above, the width W3 of the valve body 300 of the check valve 3 is narrower than the width W1 of the flow path part 211 of the flow path 208 on the back side in the normal rotation direction. Accordingly, the viscous fluid 6 that has flowed into the flow path 208 from the region 218 is discharged to the region 217 between the vane 401 of the rotor 4 and the end surface 209 on the back side in the normal rotation direction of the partitioning part 204 of the case 2, without being obstructed by the check valve 3. Accordingly, the pressure of the viscous fluid 6 in the region 218 is not increased, and weak braking torque is generated against the rotating force applied to the rotor 4 in the reverse rotation direction R2.

Hereinabove, one embodiment of the present invention has been described.

According to the present embodiment, when the check valve 3 moves in the closing direction M1 in the flow path 208 to the position where the ring-shaped elastic member 306 of the reaction-force giving part 302 of the check valve 3 abuts against the step surface 214, the ring-shaped elastic member 306 of the reaction-force giving part 302 gives reaction force to the check valve 3. Accordingly, it is necessary to apply stronger rotating force to the rotor 4 in the normal rotation direction R1 in order to move the check valve 3 further in the closing direction M1, and thus the braking torque against the rotating force applied to the rotor 4 in the normal rotation direction R1 increases gradually. When the ring-shaped elastic member 306 is elastically deformed by the rotating force applied to the rotor 4 in the normal rotation direction R1 and the check valve 3 moves further in the closing direction M1, the check valve 3 closes the flow path 208 and prevents movement of the viscous fluid 6, so that strong braking torque is generated against the rotating force applied to the rotor 4 in the normal rotation direction R1.

Thus, according to the present embodiment, it is possible to realize such a braking torque characteristic that braking torque against the rotating force applied to the rotor 4 in the normal rotation direction R1 increases gradually and finally strong braking torque is generated. Further, it is possible to adjust the braking torque characteristic by adjusting the reaction force of the check valve 3.

In the present embodiment, the check valve 3 provided with the reaction-force giving part 302 is placed in the flow path 308. Accordingly, it is not necessary to prepare a special space for the reaction-force giving part 302. Thus, it is possible to reduce the size of the rotary damper 1.

Further, in the present embodiment, the reaction-force giving part 302 comprises: the mount pillar 305 formed to be directed forward in the closing direction in the lower portion of the side surface 303 on the front side in the closing direction of the valve body 300; and the ring-shaped elastic member 306 mounted on the mount pillar 305. Accordingly, it is possible to change the timing of giving the reaction force and the magnitude of the reaction force by changing the thickness and material of the ring-shaped elastic member 306 mounted on the mount pillar 305. Thus, it is possible to adjust the reaction force of the check valve 3 easily and in turn to adjust the braking torque characteristic easily.

Further, in the present embodiment, by attaching the sliding member 408 functioning as the seal member that closes the gap between the end surface 405 of the vane 401 and the inner peripheral surface 203 of the cylindrical chamber 200, the gap between the lower surface 406 of the vane 401 and the bottom 201 of the cylindrical chamber 200, and the gap between the upper surface 407 of the vane 401 and the lower surface 504 of the lid 5, to each vane 401 of the rotor 4, it is possible to improve slidability while closing these gaps. Accordingly, it is possible to realize higher braking torque against the rotating force applied to the rotor 4 in the normal rotation direction R1, while smoothly rotating the hexagon shaft for transmitting the rotating force from the outside to the rotor 4.

The present invention is not limited to the above-described embodiment, and can be varied variously within the scope of the invention.

For example, although in the above embodiment the flow path 208 is formed in each partitioning part 204 in the cylindrical chamber 200 of the case 2, the present invention is not limited to this. A flow path may be formed in each vane 401 of the rotor 4 such that the flow path connects regions in the cylindrical chamber 200 partitioned by the vane 401.

Further, in the above embodiment, each check valve 3 is provided with the reaction-force giving part 302. The present invention, however, is not limited to this, and a reaction-force giving part 302 may be provided separately from each check valve 3. It is sufficient that a reaction-force giving part 302 can give reaction force to a check valve 3 when the check valve 3 moves to a prescribed position in the closing direction M1. For example, it is possible to attach an elastic member such as a rubber part or a spring to the step surface 214 in the flow path 208 so that the elastic member abuts against the lower portion of the side surface 303 of the valve body 300 on the front side in the normal rotation direction before the valve part 301 of the check valve 3 closes the flow path part 212 of the flow path 208 on the front side in the normal rotation direction, to give reaction force to the check valve 3.

Further, the above embodiment has been described taking the example where the pair of partitioning parts 204 is provided in the cylindrical chamber 200 of the case 2 and the rotor 4 is provided with the pair of vanes 401. However, the present invention is not limited to this. One, three, or more partitioning parts 204 and one, three, or more vanes 401 may be formed as far as the number of the partitioning parts 204 and the number of the vanes 401 are same.

Further, the above embodiment has been described taking the example of the so-called unidirectional rotary damper which generates strong braking torque when the rotor 4 rotates relative to the cylindrical chamber 200 of the case 2 in the normal rotation direction R1 and generates weak braking torque when the rotor 4 rotates relative to the cylindrical chamber 200 of the case 2 in the reverse rotation direction R2. The present invention, however, is not limited to this. The present invention can be applied to the so-called bidirectional rotary damper that generates strong braking torque against both the normal rotation direction R1 and the reverse rotation direction R2. In this case, each partitioning part 204 of the case 2 or each vane 401 of the rotor 4 is provided with, in addition to the flow path 208, a flow path which has similar structure to the flow path 208 but has a constant width in the flow path part on the back side in the reverse rotation direction and, in the flow path part on the front side in the reverse rotation direction, a width becoming gradually narrower from the constant width toward the front side in the reverse rotation direction. And in this flow path, a check valve having similar structure to the check valve 3 is placed so that the reverse rotation direction becomes the closing direction.

The rotary damper 1 according to the above embodiment can be widely applied to a seat that has a reclining function and is used, for example, in an automobile, a railroad vehicle, an airplane, a ship, or the like. Further, the rotary damper 1 can be widely applied to other equipment than a seat having a reclining function as far as the equipment requires braking of rotational movement in one direction of a rotating body that rotates in two directions.

REFERENCE SIGNS LIST

1: rotary damper; 2: case; 3: check valve; 4: rotor; 5: lid; 6: viscous fluid; 200: cylindrical chamber; 201: bottom of the cylindrical chamber 200; 202: opening part of the cylindrical chamber 200; 203: inner peripheral surface of the cylindrical chamber; 204: positioning projection of the cylindrical chamber 200; 205: end surface of the partitioning part 204; 206: opening side of the cylindrical chamber 200; 207: female screw portion of the cylindrical chamber 200; 208: flow path; 209: end surface of the flow path 208 on the back side in the normal rotation direction; 210: end surface of the flow path on the front side in the normal rotation direction; 211: flow path part of the flow path 208 on the back side in the normal rotation direction; 212: flow path part of the flow path 208 on the front side in the normal rotation direction; 213: stopper; 214: step surface of the flow path 208; 215: groove in the step surface 214; 220: center line of the cylindrical chamber 200; 300: valve body; 301: valve part; 302: reaction-force giving part; 303: side surface of the valve body 300 on the front side in the closing direction; 304: upper surface of the valve part 301; 305: mount pillar of the reaction-force giving part 302; 306: ring-shaped elastic member of the reaction-force giving part; 400: rotor body; 401: vane; 402: upper end of the rotor body 400; 403: lower end of the rotor body 400; 404: outer peripheral surface of the rotor body 400; 405: end surface of the vane 401; 406: lower surface of the vane 401; 407: upper surface of the vane 401; 408: seal member; 409: through-hole of the rotor body 400; 420: rotation axis of the rotor 4; 500: opening part of the lid 5; 501: outer peripheral surface of the lid 5; 502: male screw portion of the lid 5; 503: upper surface of the lid 5; and 504: lower surface of the lid 5.

The invention claimed is:

1. A rotary damper that generates braking torque against applied rotating force by limiting movement of viscous fluid, comprising:
   a case which has: a cylindrical chamber filled with the viscous fluid; and a partitioning part having a protruded shape which is formed along a center line of the cylindrical chamber and inward in a radial direction from an inner peripheral surface of the cylindrical chamber;
   a rotor which has: a rotor body received in the cylindrical chamber rotatably relative to the cylindrical chamber, so that an outer peripheral surface of the rotor body is close to an end surface of the partitioning part; and a vane formed along the center line of the cylindrical chamber and outward in a radial direction from the outer peripheral surface of the rotor body, so that an end surface of the vane is close to the inner peripheral surface of the cylindrical chamber;
   a lid which is fixed to an opening part of the cylindrical chamber, to confine the rotor together with the viscous fluid in the cylindrical chamber;
   a flow path, which is provided in the partitioning part or in the vane and connects regions in the cylindrical chamber partitioned by the partitioning part or the vane;
   a check valve, which is movably provided in the flow path, to close the flow path when the rotor rotates relative to the cylindrical chamber in a normal rotation direction and to open the flow path when the rotor rotates relative to the cylindrical chamber in a reverse rotation direction; and
   a reaction-force giving means, which generates reaction force to the check valve when the check valve moves to a prescribed position in a direction to close the flow path, wherein:
   the flow path has step structure in which a depth of a flow path part on a front side in the direction to close the flow path is shallower than a depth of a flow path part on a back side; and
   the reaction-force giving means has an elastic member which is attached to the check valve and abuts against a step surface due to the step structure of the flow path when the check valve moves in the direction to close the flow path, before the check valve closes the flow path.

2. A rotary damper of claim 1, wherein:
   the reaction-force giving means further has a mounting means on which the elastic member is to be mounted; and
   the elastic member can be detached from the mounting means.

3. A rotary damper of claim 1, further comprising:
   a sliding member which is attached to the vane and functions as a seal member closing a gap between the end surface of the vane and the inner peripheral surface of the cylindrical chamber, a gap between a lower surface of the vane and a bottom of the cylindrical chamber, and a gap between an upper surface of the vane and a lower surface of the lid.

4. A rotary damper of claim 2, further comprising:
   a sliding member which is attached to the vane and functions as a seal member closing a gap between the end surface of the vane and the inner peripheral surface of the cylindrical chamber, a gap between a lower surface of the vane and a bottom of the cylindrical chamber, and a gap between an upper surface of the vane and a lower surface of the lid.

5. A rotary damper of claim 1 that generates braking torque against applied rotating force by limiting movement of viscous fluid, comprising:
- a case which has: a cylindrical chamber filled with the viscous fluid; and a partitioning part having a protruded shape which is formed along a center line of the cylindrical chamber and inward in a radial direction from an inner peripheral surface of the cylindrical chamber;
- a rotor which has: a rotor body received in the cylindrical chamber rotatably relative to the cylindrical chamber, so that an outer peripheral surface of the rotor body is close to an end surface of the partitioning part; and a vane formed along the center line of the cylindrical chamber and outward in a radial direction from the outer peripheral surface of the rotor body, so that an end surface of the vane is close to the inner peripheral surface of the cylindrical chamber;
- a lid which is fixed to an opening part of the cylindrical chamber, to confine the rotor together with the viscous fluid in the cylindrical chamber;
- a flow path, which is provided in the partitioning part or in the vane and connects regions in the cylindrical chamber partitioned by the partitioning part or the vane;
- a check valve, which is movably provided in the flow path, to close the flow path when the rotor rotates relative to the cylindrical chamber in a normal rotation direction and to open the flow path when the rotor rotates relative to the cylindrical chamber in a reverse rotation direction; and
- a reaction-force giving means, which generates reaction force to the check valve when the check valve moves to a prescribed position in a direction to close the flow path, wherein:
- the flow path has step structure in which a depth of a flow path part on a front side in the direction to close the flow path is shallower than a depth of a flow path part on a back side; and
- the reaction-force giving means has an elastic member which is attached to a step surface due to the step structure of the flow path and abuts against the check valve when the check valve moves in the direction to close the flow path, before the check valve closes the flow path.

6. A rotary damper of claim 5, wherein:
the reaction-force giving means further has a mounting means on which the elastic member is to be mounted; and
the elastic member can be detached from the mounting means.

7. A rotary damper of claim 5, further comprising:
a sliding member which is attached to the vane and functions as a seal member closing a gap between the end surface of the vane and the inner peripheral surface of the cylindrical chamber, a gap between a lower surface of the vane and a bottom of the cylindrical chamber, and a gap between an upper surface of the vane and a lower surface of the lid.

8. A rotary damper of claim 6 further comprising:
a sliding member which is attached to the vane and functions as a seal member closing a gap between the end surface of the vane and the inner peripheral surface of the cylindrical chamber, a gap between a lower surface of the vane and a bottom of the cylindrical chamber, and a gap between an upper surface of the vane and a lower surface of the lid.

* * * * *